April 6, 1954
L. E. RUSSELL
2,674,087
EXHAUST DEFLECTOR
Filed May 13, 1948
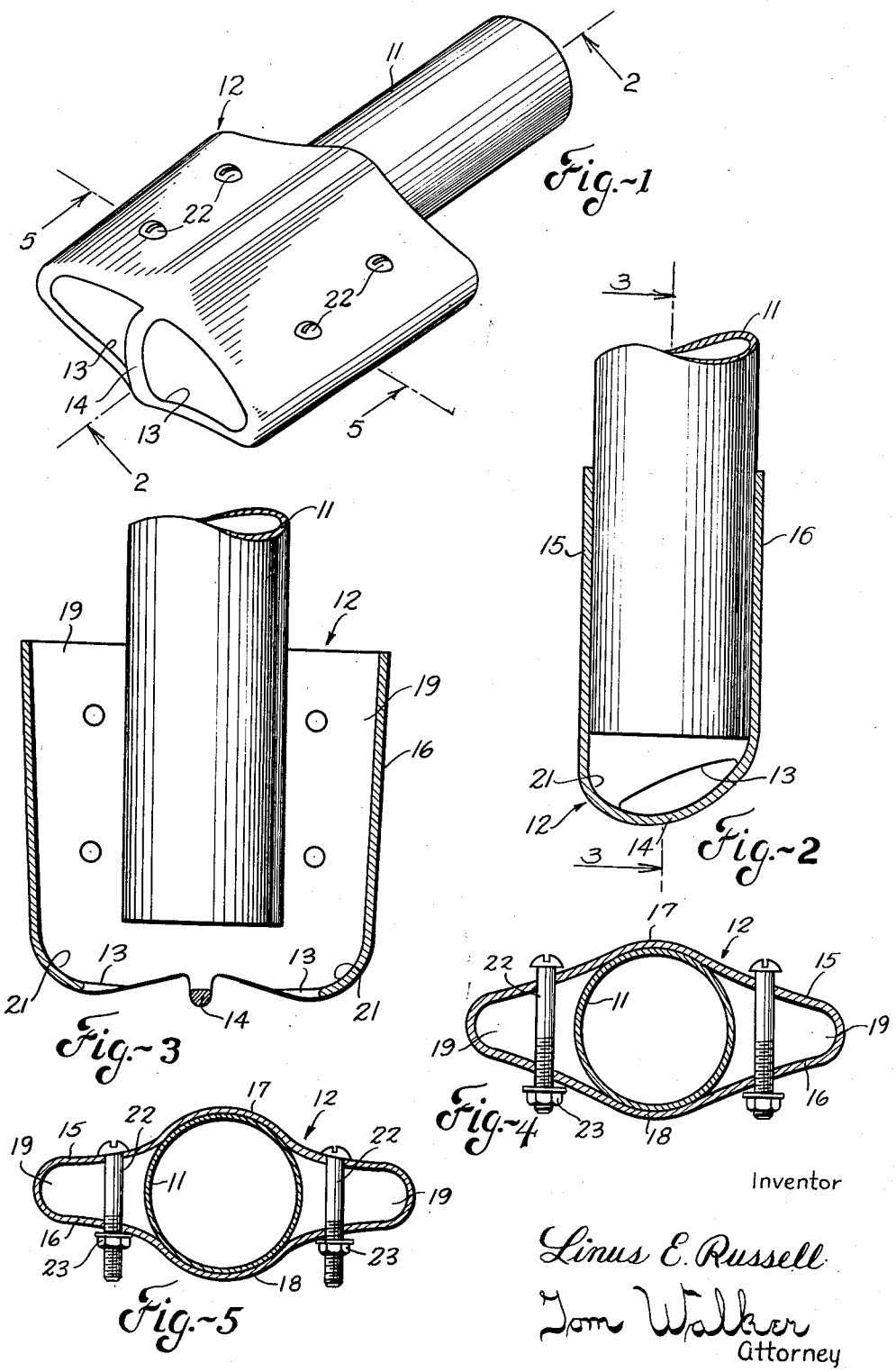
Inventor
Linus E. Russell
Tom Walker
Attorney Patented Apr. 6, 1954

2,674,087

UNITED STATES PATENT OFFICE 2,674,087

EXHAUST DEFLECTOR

Linus E. Russell, Springfield, Ohio, assignor to Peters & Russell, Inc., Springfield, Ohio, a corporation of Ohio Application May 13, 1948, Serial No. 26,839

10 Claims. (Cl. 60—30)

This invention relates to exhaust deflectors of the kind mounted as extensions upon the tail pipes of automobiles, and more particularly to an integral one-piece deflector including a self-contained clamping feature by means of which the deflector is mounted on an automobile tail pipe.

Such devices have heretofore been known, serving the function of shielding finished parts of the automobile from contact with the spent gases of combustion from the engine. Certain problems and advantages have attended use of exhaust deflectors, however, including those of cooling of the device and of simplified and effective attachment to the tail pipe. Being mounted directly upon the tail pipe, the deflector is subject to finish and structural deterioration caused by heat of the exhaust gases. Further, the tail pipe unavoidably vibrates to a greater or lesser extent in operation of the automobile with the result that insecure attachment of the deflector device to the tail pipe gives rise to objectionable noise and sometimes to loss of the device.

The object of the present invention is to simplify the construction as well as the means and mode of securing a deflector of the type shown herein to an automobile tail pipe, whereby such deflectors may not only be economically manufactured, but will be more efficient in use, adaptable to a wide variety of tail pipes, having relatively few parts and be unlikely to get out of repair.

A further object of the present invention is to simplify the structure and manner of attachment of exhaust deflectors of the kind described.

Another object of the invention is to obtain an exhaust deflector device of unitary one-piece construction in which the provision of separate attachment means is unnecessary.

A further object of the invention is to make the exhaust deflector of a semi-rigid material, such as a light sheet metal so constructed and arranged as to be deformed into clamping engagement with the exhaust tail pipe.

Still another object of the invention is to adapt an exhaust deflector for the flow of air therethrough as a coolant, the air passages being so restricted and so arranged relatively to the tail pipe as to contribute to a Venturi action upon the exhaust gases.

A still further object is to utilize the deforming of the material of the deflector in installation to narrow the air passages through the deflector, as an aid to the Venturi action.

A further object of the invention is to provide an exhaust deflector possessing the advantageous structural features, the inherent meritorious characteristics and the mode of attachment herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawing, or its equivalents.

Referring to the accompanying drawing, wherein is found the preferred but obviously not necessarily the only form of embodiment of the invention, Fig. 1 is a perspective view of the end of an exhaust tail pipe, showing an exhaust deflector embodying the present invention mounted thereon;

Fig. 2 is a vertical longitudinal section of the deflector tail pipe assembly taken substantially along the line 2—2 of Fig. 1;

Fig. 3 is a view similar to Fig. 2, but in horizontal longitudinal section, taken substantially along the line 3—3 of Fig. 2;

Fig. 4 is a view in cross-section of the deflector tail pipe assembly, showing the parts in the position they assume after placement of the deflector upon the tail pipe, but before deformation of the deflector into clamping engagement with the tail pipe, and Fig. 5 is a view similar to Fig. 4, showing the deflector fully installed, and is taken substantially along the line 5—5 of Fig. 1.

Like parts are indicated by similar characters of reference throughout the several views.

Referring to the drawing, there is indicated at 11 the end fragment of the exhaust tail pipe of an automobile or other internal combustion engine powered vehicle. The tail pipe 11 is, in accordance with conventional practice, cylindrical in shape and has mounted on the terminal end thereof an exhaust deflector or extension 12 constructed and arranged in accordance with the present invention.

The device 12 is of one-piece construction, being made of sheet metal or the like and formed as by drawing to a cupped configuration. Such drawing results in a device generally tubular in shape having oppositely disposed open and closed ends. The open end of the device receives the exhaust tail pipe. The closed end has openings 13 punched therein through which the exhaust gases may be discharged. The openings 13 are separated by a web of material 14 and have an irregular shape tapering from a maximum width at the web 14 to a minimum width adjacent the sides of the deflector.

The deflector is flattened to present a horizontally elongated appearance and to define vertically spaced walls 15 and 16.

As shown in the drawing, longitudinally extending arcuate portions 17 and 18 are formed in the top and bottom walls 15 and 16, respectively, such portions being complementary to the cylindrical tail pipe 11. The arcuate portions are approximately centrally disposed in the deflector walls and serve as a guide or locating means for placing the deflector in predetermined relation with the tail pipe.

The deflector device being considerably wider than the tail pipe 11, it is open for the flow of air therethrough in passages 19 alongside the tail pipe 11. Motion of the automotive vehicle induces a continuous flow of air through the passages 19 and the air acts as a coolant, carrying off a substantial part of the heat of the exhaust gases. In addition, the air streams being discharged through the openings 13 in intimate contacting relationship to the end of the exhaust tail pipe exercise a Venturi action aiding in the withdrawal and discharge of the exhaust gases. The Venturi action is assisted by a rounded contour 21 at the end of each passage 19 adjacent the opening 13 whereby the air flowing through the passages 19 is diagonally directed across the end of the tail pipe 11 into the path of the gases escaping therefrom. The rounded contour 21, it will be noted, completely surrounds the openings 13 and, in addition to deflecting the air, offers a smooth continuous surface inhibiting the collection within the deflector device of soot and other matter discharged from the tail pipe. Further, as may be seen in Figure 3, the exhaust deflector 12 has a slightly tapered formation, narrowing toward the discharge end thereof as in a Venturi device.

The attachment means for fastening the exhaust deflector to the tail pipe resides in a plurality of bolts 22 and associated nuts 23. The deflector is constructed with two spaced openings on either side of the longitudinal formations 17 and 18 in the side walls 15 and 16. The bolts 22 are passed through these openings and the heads thereof allowed to rest upon the upper surface of the upper wall 15. The lower ends of the bolts 22 are threaded and nuts 23 placed thereon and turned toward into contacting relationship to the lower wall 16.

The sheet metal of the deflector device is of a semi-rigid nature and continued advancement of the nuts 23 along the bolts 22 after the nuts have initially contacted the deflector wall results in further deformation of the deflector walls one toward the other. Such deformation, exercised in the presence of the tail pipe, causes an extended area of the deflector walls 15 and 16 to move into complementary contacting relation with the tail pipe and effects a tight frictional engagement of the deflector and the tail pipe.

Additionally, such deformation of the deflector walls results in a narrowing of the air passages 19 alongside the tail pipe. The parts are shown in Fig. 4 with the bolts 22 and nuts 23 installed in the assembly, but before turning of the nuts 23 upward to deform the material of the deflector. Fig. 5 shows the parts after the nuts 23 have been so turned, showing the deflector in clamping engagement with the exhaust tail pipe 11.

With regard to the preshaped longitudinal formations 17 and 18, it will be understood that the function of these is largely that of a locating means for the tail pipe. Either one or both of these formations could be omitted if desired and the walls 15 and 16 pressed to a shape complementary to that of the tail pipe by action of the clamping means 22—23 alone.

From the above description it will be apparent that there is thus provided a device of the character described possessing the particular features of advantages before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. An exhaust deflector for deflecting exhaust gases issuing from an exhaust tail pipe, comprising a cupped housing made of a semi-rigid material and transversely flattened to present spaced deformable walls intermediate the respective closed and open ends of the cupped housing, said closed end having an opening therein for the discharge of exhaust gases and said open end receiving the exhaust tail pipe, an initial configuration in said housing defining an enlarged area in which said tail pipe is initially received with a limited area of contact with said spaced walls, and clamping means extending transversely through said spaced walls intermediate the ends thereof and adjustable to deform said walls into more extensive contact with said tail pipe for clamping engagement therewith.

2. An exhaust deflector for deflecting exhaust gases issuing from an exhaust tail pipe, comprising a cupped housing made of a semi-rigid material and transversely flattened to present spaced deformable walls intermediate the respective closed and open ends of the cupped housing, said closed end having an opening therein for the discharge of exhaust gases and said open end receiving the exhaust tail pipe, a longitudinal formation in said housing defining an enlarged area in which said tail pipe is initially received with a limited area of contact with said spaced walls, said longitudinal formation further defining in conjunction with said spaced walls and the sides of the housing longitudinal passages for air flow in contacting relation with the sides of the tail pipe, and clamping means extending transversely through said passages between said spaced walls and adjustable to deform said walls to effect clamping contact of the walls with the tail pipe throughout an increased area and to narrow said air passages.

3. An exhaust deflector for deflecting exhaust gases issuing from an exhaust tail pipe, comprising a tubular housing for telescopic mounting upon an exhaust tail pipe, said housing being made of semi-rigid material and flattened to present spaced deformable side walls, a longitudinal formation in said housing defining a guide opening in which the tail pipe is initially received with a limited area of contact with said spaced side walls, and clamping means extending transversely through said spaced side walls in spaced relation to said longitudinal formation and to the tail pipe received therein and adjustable to deform said walls into more extensive contact with the tail pipe for clamping engagement therewith.

4. An exhaust deflector according to claim 3, characterized in that said clamping means comprises bolts passed transversely through said side walls on opposite sides of said guide opening and nuts rotatable on said bolts to squeeze and to deform said side walls.

5. An exhaust deflector comprising a tubular housing for telescopic mounting upon an exhaust tail pipe from which issues exhaust gases, said housing being made of a semi-rigid material and flattened to present spaced deformable side walls, a longitudinal formation in said housing defining a guide opening in which the tail pipe is received and further defining on opposite sides thereof air passages in contacting relation with the tail pipe, and clamping means extending transversely through said passages between said spaced side walls and adjustable to clamp said housing upon said tail pipe and to deform said side walls to narrow said air passages.

6. An exhaust deflector according to claim 5, characterized in that said housing is tapered toward the discharge ends of said air passages and further in that said housing presents curved surfaces at the discharge ends of said air passages deflecting the air into the path of the exhaust gases from the tail pipe.

7. An exhaust deflector comprising a tubular housing for telescopic mounting upon an exhaust tail pipe, said housing being made of a semi-rigid material and flattened to present spaced deformable side walls, a longitudinal formation in said housing defining a guide opening in which the tail pipe initially is received with a limited area of contact with said spaced side walls and further defining on opposite sides thereof air flow passages through said housing alongside the tail pipe, and clamping means extending transversely through said side walls and adjustable to deform said walls to effect a more extensive contact of the walls with the tail pipe and to narrow said air passages.

8. An exhaust deflector comprising an integral one-piece cup-shaped unit telescopically engageable about the end of an exhaust pipe from which issues exhaust gases, compression means carried by the deflector for compressing the sides thereof into contact clamping engagement with the exhaust pipe, air passages formed intermediate the deflector and the engaged exhaust pipe, and discharge ports in the end of the deflector through which exhaust gases intermixed with the air drawn through the air passages may be discharged to atmosphere.

9. An exhaust deflector comprising a one-piece, cup-shaped unit telescopically engageable about the end of an exhaust pipe from which issues exhaust gases, means for compressing and deforming the walls of the deflector into contact clamping engagement with the inserted exhaust pipe, said deflector including laterally spaced areas, which in conjunction with the inserted exhaust pipe form passages through which air may flow in intimate contact with the exposed wall of the exhaust pipe, and discharge ports in the end of the deflector, the construction and arrangement being such that the air flow through the passages is deflected into the stream of exhaust gases for intermixture therewith prior to discharge of exhaust gas mixture through the discharge ports of the deflector.

10. An exhaust deflector for deflecting exhaust gases issuing from an exhaust tail pipe comprising a flattened cup-shaped unit, means for further flattening the walls of the unit into contact clamping relation with an exhaust pipe over which the unit is telescopically engageable, the construction and arrangement being such that a series of air passages are formed intermediate the enclosed exhaust pipe and the walls of the deflector unit, and discharge ports in the end of the deflector through which exhaust gases intermixed with air are discharged to atmosphere.

References Cited in the file of this patent

UNITED STATES PATENTS

| Number | Name | Date |
|---|---|---|
| D. 149,650 | Kelly | May 18, 1948 |
| 340,263 | Weber | Apr. 20, 1886 |
| 1,017,638 | McCoola | Feb. 13, 1912 |
| 1,101,699 | Klein | June 30, 1914 |
| 1,217,615 | McDowell | Feb. 27, 1917 |
| 1,491,873 | McMurtrie | Apr. 29, 1924 |
| 1,813,189 | Moore | July 7, 1931 |
| 2,161,895 | Brenner | June 13, 1939 |
| 2,162,683 | Tobin | June 13, 1939 |
| 2,500,510 | Barnes | Mar. 14, 1950 |

FOREIGN PATENTS

| Number | Country | Date |
|---|---|---|
| 476,931 | Great Britain | Dec. 20, 1937 |